United States Patent [19]
Jiles

[11] Patent Number: 5,050,310
[45] Date of Patent: Sep. 24, 1991

[54] PLASTIC-PIPE OVALITY GAUGE

[76] Inventor: Stephen L. Jiles, 1513 Dogwood Ave., Anaheim, Calif. 92801

[21] Appl. No.: 595,279

[22] Filed: Oct. 9, 1990

Related U.S. Application Data

[63] Continuation-in-part of Ser. No. 421,161, Oct. 13, 1989, Pat. No. 5,020,401.

[51] Int. Cl.$^5$ .............................................. G01B 3/38
[52] U.S. Cl. ..................................... 33/550; 33/555.2; 33/567; 33/501.45
[58] Field of Search ............... 33/550, 551, 552, 555.1, 33/555.2, 555.3, 543, 501.45, 783, 813, 826, 828, 544, 567

[56] References Cited

U.S. PATENT DOCUMENTS

| | | | |
|---|---|---|---|
| 69,953 | 10/1867 | Richards | 33/567 |
| 648,390 | 5/1900 | Coe | 33/555.2 |
| 869,762 | 10/1907 | Woerner | 33/813 |
| 1,279,645 | 9/1918 | Bryant | 33/562 |
| 1,284,017 | 11/1918 | Wittstein . | |
| 1,898,133 | 2/1933 | Leibe . | |
| 2,331,987 | 10/1943 | Leatherman | 33/174 |
| 2,408,672 | 10/1946 | Mennesson | 33/555.3 |
| 2,589,141 | 3/1952 | Rosser | 33/567 |
| 3,426,437 | 2/1969 | Rebhun et al. | 33/543 |
| 3,648,377 | 3/1972 | Witzke | 33/174 R |
| 4,240,206 | 12/1980 | Baresh et al. | 33/555.1 |
| 4,283,858 | 8/1981 | Sobczak | 33/555.2 |
| 4,447,957 | 5/1984 | Cavazza | 33/555.1 |
| 4,517,747 | 5/1985 | Morin | 33/555.2 |
| 4,754,551 | 7/1988 | Scott | 33/169 C |
| 4,977,682 | 12/1990 | Allen, III | 33/550 |

FOREIGN PATENT DOCUMENTS

| | | | |
|---|---|---|---|
| 0398602 | 7/1924 | Fed. Rep. of Germany | 33/813 |
| 0115995 | 5/1918 | United Kingdom | 33/813 |
| 0394909 | 7/1933 | United Kingdom | 33/555.1 |
| 2087561 | 5/1982 | United Kingdom | 33/555.1 |

Primary Examiner—William A. Cuchlinski, Jr.
Assistant Examiner—Alvin Wirthlin
Attorney, Agent, or Firm—Christie, Parker & Hale

[57] ABSTRACT

A combined pipe chamfering tool and ovality gauge. One or more ovality gauge(s) is/are rotatably mounted on a chamfering tool. The gauges may serve to gauge different-size pipes to a given ovality standard or a given pipe size to different ovality standards.

8 Claims, 2 Drawing Sheets

PLASTIC-PIPE OVALITY GAUGE

CROSS-REFERENCE TO RELATED APPLICATIONS

This application is a continuation-in-part of application Ser. No. 07/421,161, filed Oct. 13, 1989, now U.S. Pat. No. 5,020,401.

FIELD OF THE INVENTION

This invention relates to gauges for inspection of plastic pipe, particularly for fluid transmission.

BACKGROUND OF THE INVENTION

The days of cast-iron pipe, with rigid dimensions, have passed in fluid distribution systems for utilities, such as heating gas distributors. Today, plastic pipes are universally used. They are cheaper, car be joined by simple heating techniques, and deteriorate at a much slower pace than metal pipes. However, plastic pipes are much less rigid than cast-iron pipes and when wound, as they are, into large coils for transportation and storage, they tend to become oval, rather than circular, in cross-section. If the ovality of a pipe becomes excessive, it cannot be joined with another pipe in the course of installing a distribution network. Since thousands of feet of pipe may be involved in an installation, unusable pipe results in an unnecessary and unacceptable expense. Thus, the burden is shifted to the incoming inspection and quality control departments of producers and large-scale users of plastic pipe. Ovality and wall thickness must be checked before the pipe is sent out into the field and at the time a joinder to another pipe is attempted in the field. Therefore, it is an object of this invention to provide a gauge which may be used quickly and with a minimum of training, to determine whether or not a plastic pipe exceeds a predetermined limit on ovality. A related object of the invention is to provide a set of gauges which may be used to determine the degree of ovality of a plastic pipe or to determine whether or not plastic pipes of different diameters exceed a predetermined ovality limit.

SUMMARY OF THE INVENTION

In accordance with the invention, there is provided an ovality gauge for use with plastic pipes of a predetermined nominal outside diameter, with the ovality gauge including a body portion terminating in a pair of opposed tips spaced apart by a distance approximating the nominal outside diameter of the plastic pipe whose ovality is to be tested. The distance between the opposing tips is preferably less than the nominal outside diameter of the plastic pipe by a predetermined, marginal amount. This amount reflects the negative deviation of the pipe's outside diameter corresponding to the maximum tolerable pipe ovality. In accordance with the invention, pipe ovality is determined by causing the gauge tips to travel around the circumference of the pipe, while the pipe and the gauge tips are pressed against each other, and observing whether the pipe enters the gauge during any part of such travel. If the pipe enters the gauge during any part of this travel, it means that the pipe has become sufficiently deformed to exceed its maximum permissible percentage of ovality, which is defined as the difference between the maximum and minimum outside diameters of the pipe divided by its average outside diameter.

According to a further feature of the invention, a set of gauges of the type described are provided. Individual gauges of the set may have tips with facing surfaces separated by a gap, with the gaps of respective ones of the gauges being sized to be smaller than the nominal outside diameter of the plastic pipe by progressively-greater, marginal amounts. With such a set of gauges, it is possible rapidly to determine not only whether a pipe exceeds a given limit of ovality, but also whether it passes or fails a number of progressively-looser limits.

BRIEF DESCRIPTION OF THE DRAWINGS

These features and advantages of the invention, as well as other features and advantages of the invention, will be more apparent from a reading of the claims and of the detailed description of the invention, in conjunction with the drawings described below.

DETAILED DESCRIPTION

Figure 1:
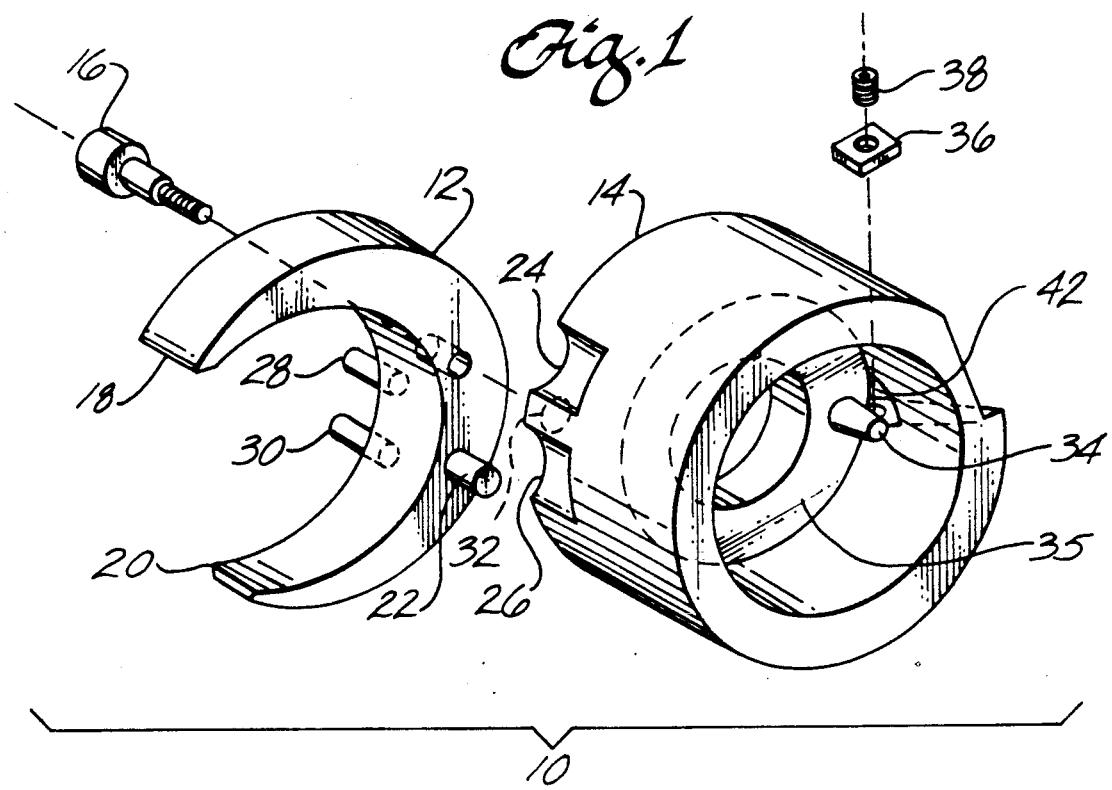
FIG. 1 is an exploded view of the universal plastic-pipe tool which is the subject of the parent of this patent application.
Figure 2:
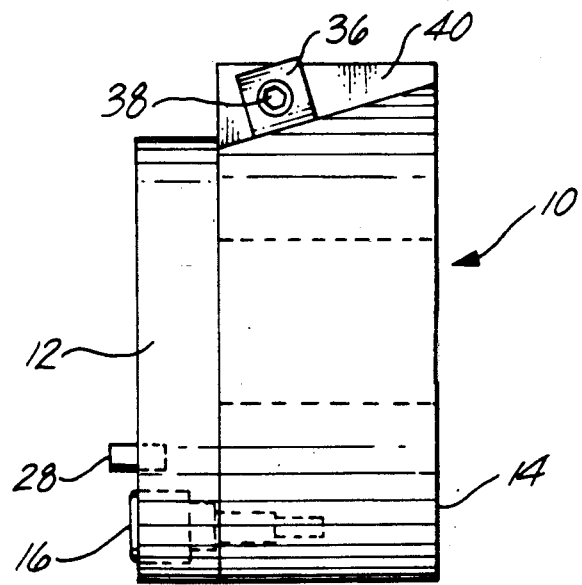
FIG. 2 is a side elevation view of the universal plastic-pipe tool of FIG. 1.
Figure 3:
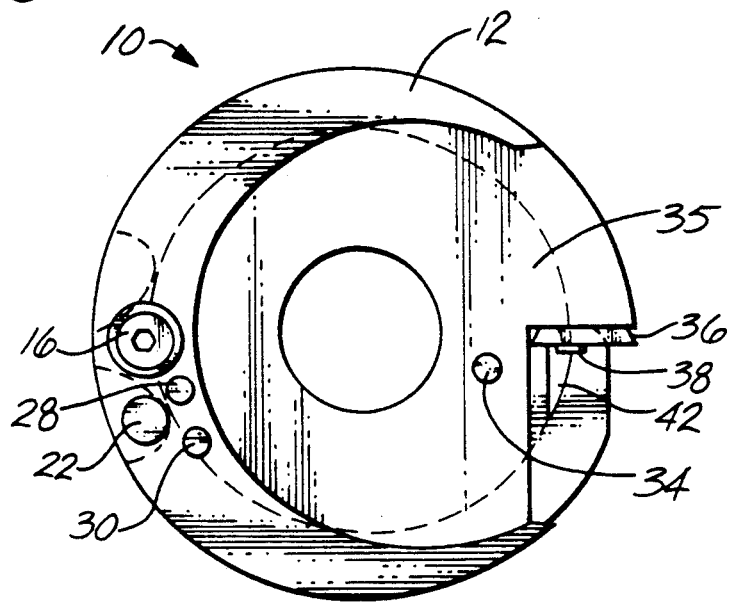
FIG. 3 is an end elevation view of the tool of FIG. 1.

In FIGS. 1-3, universal plastic-pipe tool 10 includes ovality-gauge portion 12 and chamfering element 14 arcuately-rotatably secured thereto by cap screw 16. The tip portions 18, 20 of ovality-gauge portion 12 are separated by the nominal outside diameter of the pipe being checked, less a marginal amount corresponding to the ovality tolerance set by A.S.T.M. standards.

Pin 22, in combination with recesses 24, 26, limits the arc through which ovality gauge 12 can rotate. At either of those points, ovality gauge 12 can act as a handle for rotating chamfering element 14.

Pins 28, 30 on the outer face of ovality gauge 12 have their opposing surfaces spaced by a distance equal to the maximum tolerated width of the wall of a pipe to be chamfered. Before the pipe is chamfered, its end to be chamfered has its wall inserted between pins 28, 30, and the pipe is rotated to assure that no part of the wall exceeds the thickness tolerance.

Threaded hole 32 receives the threaded end of screw 16 to secure ovality-gauge portion 12 rotatably to chamfering portion 14. Tapered pin 34 is mounted in base ring 35, internally to chamfering element 14, with its axis parallel to the axis of chamfering element 14. Cutter 36, which may be made of tungsten carbide and which has four cutting edges, is mounted by means of screw 38 to surface 40 (FIG. 2), and one edge extends through slot 42 to a position proximate to pin 34, at the approximate chamfering angle, as can be seen in FIG. 2. The chamfering angle is approximately 20 degrees, and the depth of the chamfer should not exceed one-third of the wall thickness of the pipe being chamfered.

Figure 4:
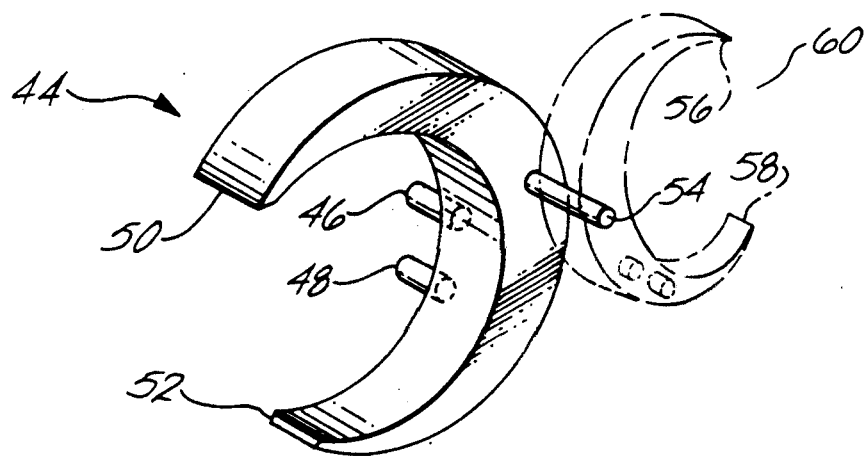
FIG. 4 is an orthogonal view of the ovality-gauge portion of the tool of FIG. 1 forming the present invention.

The ovality-gauge portion of FIG. 1 may be provided and used separately from chamfering unit 14, as shown in FIG. 4. In FIG. 4, ovality gauge 44 has a wall-thickness-measuring gauge comprising pins 46, 48, with their opposing surfaces spaced the standard wall thickness for the size of pipe being tested or used. In the gas-distribution business, the popular pipe sizes are 2" and 3", with nominal outside diameters of 2.375" and 3.5" respectively. The opposing tips 50, 52 are spaced the nominal outside diameter of the pipe minus the tolerance set by the A.S.T.M. Ovality gauges for two sizes of pipe, for example, 2" and 3", may be coupled as shown in FIG. 4 so that the gauge for the pertinent-sized pipe (44 or 60) may be swung about pin 54 into position for use, while the other gauge is out of the way. (If gauge 44 is for 3-inch pipe and gage 60 is for 2-inch pipe, tips 56, 58 of gauge 60 will be spaced a lesser distance than tips 50, 52 of gauge 44.) This combination increases the versatility of the ovality gauge.

The gauge 44 is used to test ovality in the following manner. The gauge 44 is lightly pressed against the pipe which is to be tested for ovality, so that its tips 50, 52 press against the pipe. The pipe is then rotated. If it is perfectly circular, so that its major and minor diameters are equal, it will not enter the gauge at any time during its rotation, since the distance between the gauge tips 50, 52 is slightly less than the nominal outside diameter of the pipe. Assume that a 3" pipe is being tested and than the gauge 44 is set to pass pipe whose ovality does not exceed 5%. This means that the minimum outside diameter of the pipe must not fall short of its maximum outside diameter by more than $0.05 \times 3.5 = -0.175$. That is, the maximum diameter of the pipe must not differ from the minimum diameter of the pipe by more than a predetermined permissible amount; in this instance, 0.175 inch. In order to test a 3" pipe for 5% ovality, the gap between tips 50, 52 should be $3.5 - 0.175/2 = 3.4125$, since a 0.175-inch difference between minimum and maximum outside diameters would, in most cases, result from a maximum outside diameter of $3.5" + 0.175/2 = 3.675$, and a minimum outside diameter of $3.5 - 0.175/2 = 3.4125$. Given the above dimensions, if the 3" pipe being tested has an ovality which exceeds 5%, its minimum outside diameter will be less than 3.4125", and the pipe will, at some point of its rotation, pass between the tips 50, 52 and enter the gauge 44. In situations where the pipe is in place and cannot be rotated, the tool 44 may be moved around the pipe, with the same effect. In both cases, the gauge tips are caused to travel around the circumference of the pipe while the pipe and the gauge tips are pressed against each other.

Advantageously, the gauges 44, 60 may be sized to test pipe of a given nominal outside diameter to different standards of ovality, rather than testing pipes of different nominal diameters to the same standard of ovality. Thus, assume that the user wishes to determine whether a given length of pipe which fails a 5% ovality test might pass a more lenient, 7% ovality test. To permit a user to do this, the gauge 60 would have its tips 56, 58 set apart by a smaller distance than that which separates the tips 50, 52 of the gauge 44. Thus, the degree of ovality of a pipe may be determined by successively testing it with respective ones of the gauges 44, 60. Since the gaps separating the spaced surfaces of the tips of the respective gauges are sized to be smaller than the nominal outside diameter of the pipe by progressively-greater marginal amounts, the successive tests, each involving the rotation of the pipe relative to a gauge, serve to determine the degree of ovality of the pipe. Of course, more than two gauges, each having progressively-smaller gaps between its tips, may be provided, all of them being mounted, if desired, on the common pin 54 for individual use, as described.

While particular embodiments of the universal plastic-pipe gauge have been shown and described, it will be apparent to those skilled in the art that alterations and modifications may be made therein without departing from the true scope and spirit of the invention. It is the purpose of the appended claims to cover all such alterations and modifications.

What is claimed is:

1. A first ovality gauge for checking the ovality of a first plastic pipe of a first predetermined nominal outside diameter by determining whether the maximum diameter of the pipe differs from the minimum diameter of the pipe by more than a predetermined permissible amount, said first ovality gauge including a C-shaped body portion terminating in a single pair of immovable tips facing each other for receiving said pipe, such facing tips being spaced from each other by a distance which is smaller by a predetermined amount equal to one-half of said permissible difference between said maximum and minimum diameters than the outside diameter of the first plastic pipe whose ovality is to be checked, the ability of said pipe to pass between said tips being indicative of said permissible amount being exceeded due to the ovality of the pipe.

2. Apparatus according to claim 1 which includes the combination of said first ovality gauge and a second ovality gauge rotatably coupled to said first ovality gauge for checking the ovality of a second plastic pipe of a second predetermined nominal outside diameter different from said first predetermined nominal outside diameter by determining whether the maximum diameter of the second pipe differs from the minimum diameter of the second pipe by more than a second predetermined permissible amount, said second ovality gauge having a C-shaped body portion and a second single pair of immovable tips facing each other for receiving said second pipe and spaced from each other by a distance which is smaller by a predetermined amount equal to one-half of said permissible difference between the maximum and minimum diameters of said second pipe than said second predetermined nominal outside diameter, the ability of said second pipe to pass between said second pair of tips being indicative of said second permissible amount being exceeded due to the ovality of said second pipe.

3. A first ovality gauge for checking the ovality of plastic pipes of a first predetermined nominal outside diameter, said first ovality gauge including a C-shaped body portion terminating in a single pair of immovable tips facing each other, such facing tips being spaced from each other by a distance which is smaller, by a predetermined marginal amount, than the nominal outside diameter of a first plastic pipe whose ovality is to be tested, said first ovality gauge carrying on one surface thereof a wall-thickness gauge comprising a pair of pins extending from said surface parallel to each other and separated from each other by a gap approximating the wall thickness of the pipe whose ovality is to be checked by said first ovality gauge.

4. A method of determining whether a pipe meets a predetermined tolerance for ovality comprising the steps of:
 (a) pressing said pipe and the tips of a C-shaped gauge against each other, said tips being spaced apart by a distance which is less than the nominal outside diameter of said pipe by a predetermined, marginal amount;
 (b) causing said gauge tips to travel around the circumference of said pipe at least from the pipe's maximum diameter to the pipe's minimum diameter while said pipe and said gauge tips are pressed against each other; and (c) observing whether said pipe enters said gauge during any part of such travel.

5. The method of claim 4, wherein said gauge tips are caused to travel around the circumference of said pipe by holding said gauge stationary and rotating said pipe.

6. The method of claim 4, wherein said gauge tips are caused to travel around the circumference of said pipe by holding said pipe stationary and sweeping said gauge tips around its circumference.

7. A method of determining the degree of ovality of a pipe comprising the steps of successively testing it with respective ones of a plurality of gauges, each gauge havng a pair of immovable surfaces separated by a gap, the gap separating the immovable surfaces of respective gauges being sized to be smaller than the nominal outside diameter of the pipe by progressively-greater, marginal amounts, each said step including:

(a) pressing against each other said pipe and the tips of a respective one of said gauges; and (b) causing said gauge tips to travel around the circumference of said pipe at least from the pipe's maximum diameter to the pipe's minimum diameter while said pipe and said gauge tips are pressed against each other; and (c) observing whether said pipe enters said gauge during any part of such travel.

8. The method of claim 7, wherein the step of causing said gauge tips to travel around the circumference of said pipe includes holding said gauge fixed and rotating said pipe while pressing said pipe and said gauge against each other.

* * * * *